United States Patent

[11] 3,607,275

[72] Inventors Oskar Sus;
 Georg Werner, both of Wiesbaden-Biebrich, Germany
[21] Appl. No. 779,639
[22] Filed Nov. 27, 1968
[45] Patented Sept. 21, 1971
[73] Assignee Keuffel & Esser Company
 Hoboken, N.J.
[32] Priority Nov. 29, 1967
[33] Germany
[31] P 15 97 629.1

[54] DIAZO-TYPE MATERIAL
 5 Claims, No Drawings

[52] U.S. Cl. .................................................. 96/49,
 96/75, 96/91 R, 117/36.8
[51] Int. Cl. .......................................................... G03c 1/58,
 G03c 1/60
[50] Field of Search ............................................ 117/36.2,
 36.8; 96/49, 75, 91

[56] References Cited
 UNITED STATES PATENTS

| | | | |
|---|---|---|---|
| 2,431,190 | 11/1947 | Morgan | 96/91 |
| 3,135,607 | 6/1964 | Hills | 117/36.8 |
| 3,224,878 | 12/1965 | Klimkowski et al. | 117/36.8 |
| 3,311,475 | 3/1967 | van Loon et al. | 96/91 |
| 3,288,627 | 11/1966 | Bialczak | 117/36.8 |
| 3,410,688 | 11/1968 | Welch | 96/91 |
| 3,460,943 | 8/1969 | Welch | 96/91 |
| 3,469,981 | 9/1969 | Kosar | 96/91 |
| 3,480,433 | 11/1969 | Haist et al. | 117/36.8 |

OTHER REFERENCES

Dinaburg, M. S. Photosensitive Diazo Compounds, The Focal Press, 1964, p. 112

*Primary Examiner*—William D. Martin
*Assistant Examiner*—Raymond M. Speer
*Attorneys*—J. Russell Juten, Peter F. Willig, Lionel N. White and Milford A. Juten

ABSTRACT: Diazo-type images obtained from copying material comprising p-amino benzene diazonium compounds and 2,3-dihydroxypyridine are shifted from red to blue color shades by including a water-soluble zinc salt with the diazonium compound in a ratio of at least about 2 to 1.

DIAZO-TYPE MATERIAL

BACKGROUND OF THE INVENTION

In most applications of the diazo-type copying process blue image shades are predominantly desired either alone or in combinations which result in high-contrast black images.

Copies of good contrast with blue image shades were hitherto, for the most part, practically obtainable only by using higher molecular weight naphthol derivatives. Although the dye images produced with these coupler compounds have particularly good resistance to light fading, the relatively poor water solubility of such coupler compounds restricts their suitability for use in aqueous sensitizing solutions and in many instances causes precipitation of some additives customary in diazo-type compositions. Thus, there has been a notable demand for blue coupling components of low molecular weight and good water solubility which are not adversely affected by the various pH values of sensitizing solutions.

According to earlier investigators, see for example FIAT Report No. 813, lower molecular weight, water-soluble coupler components such as 2,3-dihydroxy-pyridine are generally suitable in diazo-type processes. This compound, although useful in preparing aqueous sensitizing solutions, have never gained practical importance, however, because the red color shades obtained therewith do not meet the noted color requirements, and the contrast of resulting copies is below acceptable level.

SUMMARY OF THE INVENTION

According to the present invention diazo-type material is provided which produces images of good blue shades and includes the use of 2,3-dihydroxy-pyridine as a coupling component. It has been discovered that the use of 2,3-dihydroxy-pyridine in the diazo-type process as a coupling component provides images of surprisingly good blue color shade when a water-soluble zinc salt is incorporated with the light-sensitive diazonium compound in a ratio of at least about 2 moles of zinc salt per mole of diazonium compound.

The effectiveness of the water-soluble zinc salt is particularly surprising since the benzene compound corresponding to the 2,3-dihydroxy-pyridine, i.e. pyrocatechol, not only lacks suitability as a coupling component, but also shows no color shift in the presence of zinc salts.

The above-noted ratio of water-soluble zinc salt to diazonium compound may vary depending upon the type of diazonium compound employed, for example, when the diazonium compound is present in the form of the zinc chloride double salt the quantity of additional zinc salt may be reduced proportionately. Normally, however, optimum color shades and intensification is achieved with mole ratios of at least that earlier stated.

Particularly desirable shades of blue are produced in combination with the highly light-sensitive p-amino benzene diazonium compounds having alkoxy groups either in the 3-position or in the 2- and in the 5-position of the benzene ring, which of late have been more frequently used in diazo-type compositions. Examples of such compounds are: 4-morpholino-2, 5-diethoxy-benzene diazonium chloride; 4-morpholino-2, 5-dibutoxy benzene diazonium tetrafluoborate; 4-dimethyl-amino-2, 5-dimethoxy-benzene diazonium chloride; 4-pyrrolidino-3-methoxy-benzene diazonium chloride; 4-(N-benzyl-N-ethyl-amino)-2,5-dimethoxy-benzene diazonium hexafluorophosphate; and the like.

The process of the invention may be used for processing one-component material as well as two-component material. In either case, the zinc salt must be contained together with the light-sensitive diazonium compound in the light-sensitive layer. The diazonium compound may be selected in known manner with a view to its suitability for one- or two-component material.

It is particularly advantageous to apply the invention to two-component material, because in this case the advantage of the good compatibility of 2,3-dihydroxy-pyridine with the additives conventionally incorporated in diazo-type coatings becomes particularly evident.

Substantially all materials known and conventionally used in the diazo-type field for this purpose may be used as supports, e.g. paper, transparent paper, lacquered paper, plastic film, etc.

PREFERRED EMBODIMENTS

Example 1

A photoprinting base paper which had been provided with a precoat of colloidal silica and polyvinyl acetate was coated with the following solution:

| | |
|---|---|
| 4.0 g. | of citric acid |
| 3.0 g. | of naphthalene-1,3,6-trisulfonic acid (sodium salt) |
| 2.0 g. | of aluminum sulfate |
| 3.5 g. | of thiourea |
| 0.02 g. | of saponin |
| 1.0 g. | of 2,3-dihydroxy-pyridine |
| 1.7 g. | of 4-morpholino-2,5-diethoxy-benzene diazonium chloride (zinc chloride double salt) |
| 4.0 g. | of zinc chloride, and |
| 4.0 ml. | of propanol in |
| 100.0 ml. | of water. |

The thus-sensitized material was dried at about 70° C. and then exposed under a transparent original. After development with ammonia, copies with deep blue-violet lines on a clean white background are obtained, which are very rich in contrast.

When the diazo compound mentioned above is used without the addition of zinc chloride in excess to the sensitizing solution, photoprints with red color shades are obtained.

Example 2

| | |
|---|---|
| 2.0 g. | of citric acid |
| 1.0 g. | of boric acid |
| 2.0 g. | of thiourea |
| 2.0 g. | of 2,3-dihydroxy-pyridine |
| 3.0 g. | of 4-morpholino-2,5-dimethoxy-benzene diazonium chloride (zinc chloride double salt) |
| 4.0 g. | of zinc chloride | were dissolved in a mixture consisting of 50 ml. of water and 50 ml. of isopropanol, and the solution was coated onto transparent paper which had been lacquered with acetyl cellulose. Photoprints prepared in the normal manner showed strong violet-blue lines.

When the diazo compound is used without the addition of zinc chloride, photoprints are obtained which have violet-red color shades.

It is also possible to use an acetyl cellulose film instead of transparent paper, the results being the same as far as the color shades produced are concerned.

Example 3

A photoprinting base paper which had been precoated as in example 1 was coated with the following solution:

| | |
|---|---|
| 4.0 g. | of citric acid |
| 3.0 g. | of naphthalene-1,3,6-trisulfonic acid (sodium salt) |
| 2.0 g. | of aluminum sulfate |
| 3.5 g. | of thiourea |
| 0.02 g. | of saponin |
| 1.7 g. | of 4-(4'-methyl)-phenylmercapto-2,5-diethoxy-benzene -methyl)-phenylmercapto-2,5-diethoxy-benzene diazonium chloride (zinc chloride double salt) |
| 4.0 g. | of zinc chloride, and |
| 4.0 g. | of isopropanol in |
| 100.0 ml. | of water. |

The thus-sensitized material was dried and imagewise exposed. For development, the following solution was used:

4.0 g. of sodium chloride 2.5 g.   of sodium borate
3.0 g.   of sodium carbonate
5.0 g.   of thiourea
0.1 g.   of sodium isopropyl naphthalene sulfonate, and
1.0 g.   of 2,3-dihydroxy-pyridine in
100.0 ml.   of water.

Photoprints with strong lines of a clear blue were obtained.

When the above-mentioned diazonium compound is used in a sensitizing solution without the addition of a considerable excess of zinc chloride, copies in red color shades, with a slight violet tinge, are obtained.

Example 4

A photoprinting base paper was sensitized as described in example 1, replacing, however, the diazonium compound used in example 1 by the zinc chloride double salt of 4-dimethyl-amino-benzene diazonium chloride. After development of the exposed copies by means of ammonia, copies with dark blue-violet color shades on a clean white background were obtained.

When the diazo compound stated above is used without zinc chloride in excess in the coating solution, photoprints with red color shades are produced.

Example 5

A photoprinting base paper was sensitized as described in example 1, replacing, however, the diazonium compound used in the coating solution of example 1 by the zinc chloride double salt of 4-pyrrolidino-3-methoxy-benzene-diazonium chloride. After exposure and development of the thus-sensitized material, photoprints with deep violet-blue lines on a pure white background were obtained, which were very rich in contrast.

When the diazo compound mentioned above is used without the addition of zinc chloride to the coating solution, photoprints are obtained which have dark-red lines on a white background.

The above examples have been presented for the purpose of illustration and should not be taken to limit the scope of the present invention. It will be apparent that the described examples are capable of many variations and modifications which are likewise to be included within the scope of the present invention as set forth in the appended claims.

1. The method of forming a blue diazo-type image comprising:
   a. providing diazo-type material comprising a support and a layer thereon of a composition comprising a light-sensitive diazonium compound and a water-soluble zinc salt in at least about a 2 to 1 mole ratio with said diazonium compound;
   b. exposing said material imagewise to light for a time sufficient to selectively decompose said diazonium compound; and
   c. coupling the remaining diazonium compound with 2,3-dihydroxy-pyridine.

2. The method according to claim 1 wherein said composition further comprises said 2,3-dihydroxy-pyridine and sufficient acid stabilizer to prevent dye-forming coupling under normal conditions, and wherein said coupling step comprises alkalizing said composition to thereby neutralize said acid stabilizer and form a condition of pH in said composition conducive to dye formation.

3. The method according to claim 1 wherein said composition consists essentially of said diazonium compound and said zinc salt, and said coupling step comprises contacting said material with a solution comprising said 2,3-dihydroxy-pyridine.

4. The method according to claim 1 wherein said diazonium compound is: a p-amino benzene diazonium compound and said zinc salt is zinc chloride.

5. The method according to claim 1 wherein said diazonium compound is selected from the group consisting of 3-alkoxy- and 2,5-dialkoxy-p-amino benzene diazonium compounds.

PO-1050
(5/69)

UNITED STATES PATENT OFFICE
CERTIFICATE OF CORRECTION

Patent No. 3,607,275   Dated   21 September 1971

Inventor(s)   Oskar Sus; Georg Werner

It is certified that error appears in the above-identified patent and that said Letters Patent are hereby corrected as shown below:

Column 2, lines 67 through 69 should read:

--1.7g of 4-(4'-methyl)-phenylmercapto-2,5-diethoxy-benzene diazonium chloride (zinc chloride double salt)--

Signed and sealed this 14th day of March 1972.

(SEAL)
Attest:

EDWARD M. FLETCHER, JR.
Attesting Officer

ROBERT GOTTSCHALK
Commissioner of Patents